United States Patent
Seo et al.

(10) Patent No.: US 8,840,518 B2
(45) Date of Patent: Sep. 23, 2014

(54) PLANETARY GEAR TRAIN OF AUTOMATIC TRANSMISSION FOR VEHICLES

(75) Inventors: Kangsoo Seo, Suwon-si (KR); Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 99 days.

(21) Appl. No.: 13/545,742

(22) Filed: Jul. 10, 2012

(65) Prior Publication Data
US 2013/0150202 A1  Jun. 13, 2013

(30) Foreign Application Priority Data
Dec. 9, 2011  (KR) .................. 10-2011-0131905

(51) Int. Cl.
*F16H 3/62* (2006.01)

(52) U.S. Cl.
USPC ......................... 475/278; 475/313; 475/325

(58) Field of Classification Search
USPC ......... 475/271, 275, 277, 278, 284, 288, 313, 475/325
See application file for complete search history.

(56) References Cited

U.S. PATENT DOCUMENTS

| 7,008,346 | B2 * | 3/2006 | Stevenson .................. 475/275 |
| 7,678,009 | B2 | 3/2010 | Phillips et al. |
| 8,083,632 | B2 * | 12/2011 | Wittkopp ................... 475/275 |
| 2013/0324349 | A1 * | 12/2013 | Hoffman et al. .............. 475/275 |

FOREIGN PATENT DOCUMENTS

| JP | 2004-028328 | 1/2004 |
| JP | 2005-241002 | 9/2005 |
| JP | 2009-047303 | 3/2009 |
| KR | 10-0883234 | 2/2009 |
| KR | 10-1028544 | 4/2011 |

\* cited by examiner

*Primary Examiner* — Jacob S Scott
(74) *Attorney, Agent, or Firm* — Morgan, Lewis & Bockius LLP

(57) ABSTRACT

A planetary gear train may include an input shaft, an output gear, a compound planetary gear set including a first and second sun gears, a common planet carrier, and a common ring gear, a third planetary gear set including a third sun gear, a third planet carrier, and a third ring gear, a first rotational member consisting of the second sun gear, a second rotational member consisting of the common planet carrier selectively connected to the input shaft, a third rotational member consisting of the common ring gear connected to the output gear, a fourth rotational member consisting of the first sun gear, a fifth rotational member consisting of the third ring gear connected to the input shaft, a sixth rotational member consisting of the third planet carrier, a seventh rotational member consisting of the third sun gear operated as a selective fixed element, and friction members.

4 Claims, 3 Drawing Sheets

FIG. 2

|  | C1 | C2 | C3 | C4 | B1 | B2 | gear ratio |
|---|---|---|---|---|---|---|---|
| D1 | ● |  |  | ● | ● |  | 5.111 |
| D2 | ● |  |  |  | ● | ● | 3.901 |
| D3 | ● |  |  | ● |  | ● | 2.246 |
| D4 | ● | ● |  |  |  | ● | 1.526 |
| D5 | ● |  | ● |  |  | ● | 1.156 |
| D6 | ● | ● | ● |  |  |  | 1.000 |
| D7 |  | ● | ● |  |  | ● | 0.870 |
| D8 |  |  | ● | ● |  | ● | 0.697 |
| REV1 |  | ● |  |  | ● | ● | -3.511 |
| REV2 |  | ● |  | ● | ● |  | -2.300 |

PLANETARY GEAR TRAIN OF AUTOMATIC TRANSMISSION FOR VEHICLES

CROSS-REFERENCE TO RELATED APPLICATION

The present application claims priority of Korean Patent Application Number 10-2011-0131905 filed Dec. 9, 2011, the entire contents of which application is incorporated herein for all purposes by this reference.

BACKGROUND OF INVENTION

1. Field of Invention

The present invention relates to an automatic transmission for vehicles. More particularly, the present invention relates to a planetary gear train of an automatic transmission for vehicles which improves power delivery performance and reduces fuel economy.

2. Description of Related Art

Typically, a planetary gear train is realized by combining a plurality of planetary gear sets, and the planetary gear train including the plurality of planetary gear sets receives torque from a torque converter and changes and transmits the torque to an output shaft.

It is well known that when a transmission realizes a greater number of shift speeds, speed ratios of the transmission can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotational elements (i.e., sun gear, planet carrier, and ring gear).

In addition, the planetary gear train has different features such a durability, power delivery efficiency, and size depend on the layout thereof. Therefore, designs for a combining structure of a gear train are also under continuous investigation.

In addition, the planetary gear train realizes a plurality of shift-speeds. However, another friction member must be operated after one friction member is released so as to shift to a neighboring shift-speed from a view of shift control.

In addition, a step ratio between the neighboring shift-speeds should be controlled to be suitable according to the planetary gear train.

Currently, four-speed and five-speed automatic transmissions are most often found on the market. However, six-speed automatic transmissions have also been realized for enhancement of performance of power transmission and for enhanced fuel mileage of a vehicle. In addition, eight-speed automatic transmissions and ten-speed automatic transmissions have been developed at a good pace.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a planetary gear train of an automatic transmission for vehicles having advantages of achieving eight forward speeds and two reverse speeds and improving power delivery performance, fuel economy, and performance in reverse speeds by combining a plurality of planetary gear sets with a plurality of friction members.

Various aspects of the present invention provide for a planetary gear train of an automatic transmission for vehicles that may include an input shaft adapted to receive engine torque, an output gear adapted to output changed torque, a compound planetary gear set formed by combining first and second planetary gear sets and including a first sun gear, a second sun gear, a common planet carrier, and a common ring gear as rotational elements thereof, a third planetary gear set including a third sun gear, a third planet carrier, and a third ring gear as rotational elements thereof, a first rotational member consisting of the second sun gear, a second rotational member consisting of the common planet carrier, and selectively connected to the input shaft so as to be operated as a selective input element or selectively connected to a transmission housing so as to be operated as a selective fixed element, a third rotational member consisting of the common ring gear and connected to the output gear so as to be operated as a final output member, a fourth rotational member consisting of the first sun gear, a fifth rotational member consisting of the third ring gear and directly connected to the input shaft so as to be always operated as an input element, a sixth rotational member consisting of the third planet carrier, a seventh rotational member consisting of the third sun gear and operated as an output element or selectively connected to the transmission housing so as to be operated as a selective fixed element, and friction members including clutches selectively connecting the rotational member operated as the selective input element to the input shaft or selectively connecting the rotational members, and brakes selectively connecting the rotational member operated as the selective fixed element to the transmission housing.

The first planetary gear set may be a double pinion planetary gear set, the second planetary gear set may be a single pinion planetary gear set, and the third planetary gear set may be a single pinion planetary gear set.

The compound planetary gear set and the third planetary gear set may be disposed in a sequence of the compound planetary gear set and the third planetary gear set from an engine to the rear.

The friction members may include a first clutch disposed between the fourth rotational member and the sixth rotational member, a second clutch disposed between the first rotational member and the sixth rotational member, a third clutch disposed between the input shaft and the second rotational member, a fourth clutch disposed between the first rotational member and the seventh rotational member, a first brake disposed between the second rotational member and the transmission housing, and a second brake disposed between the seventh rotational member and the transmission housing.

Forward speeds achieved by operating three friction members among the six friction members may include a first forward speed achieved by operating the first and fourth clutches and the first brake, a second forward speed achieved by operating the first clutch and the first and second brakes, a third forward speed achieved by operating the first and fourth clutches and the second brake, a fourth forward speed achieved by operating the first and second clutches and the second brake, a fifth forward speed achieved by operating the first and third clutches and the second brake, a sixth forward speed achieved by operating the first, second, and third clutches, a seventh forward speed achieved by operating the second and third clutches and the second brake, and an eighth forward speed achieved by operating the third and fourth clutches and the second brake.

Reverse speeds achieved by operating three friction members among the six friction members may include a first reverse speed achieved by operating the second clutch and the first and second brakes, and a second reverse speed achieved by operating the second and fourth clutches and the first brake.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction members at each shift-speed applied to an exemplary planetary gear train according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the detailed description, ordinal numbers are used for distinguishing constituent elements having the same terms, and have no specific meanings.

Figure 1:
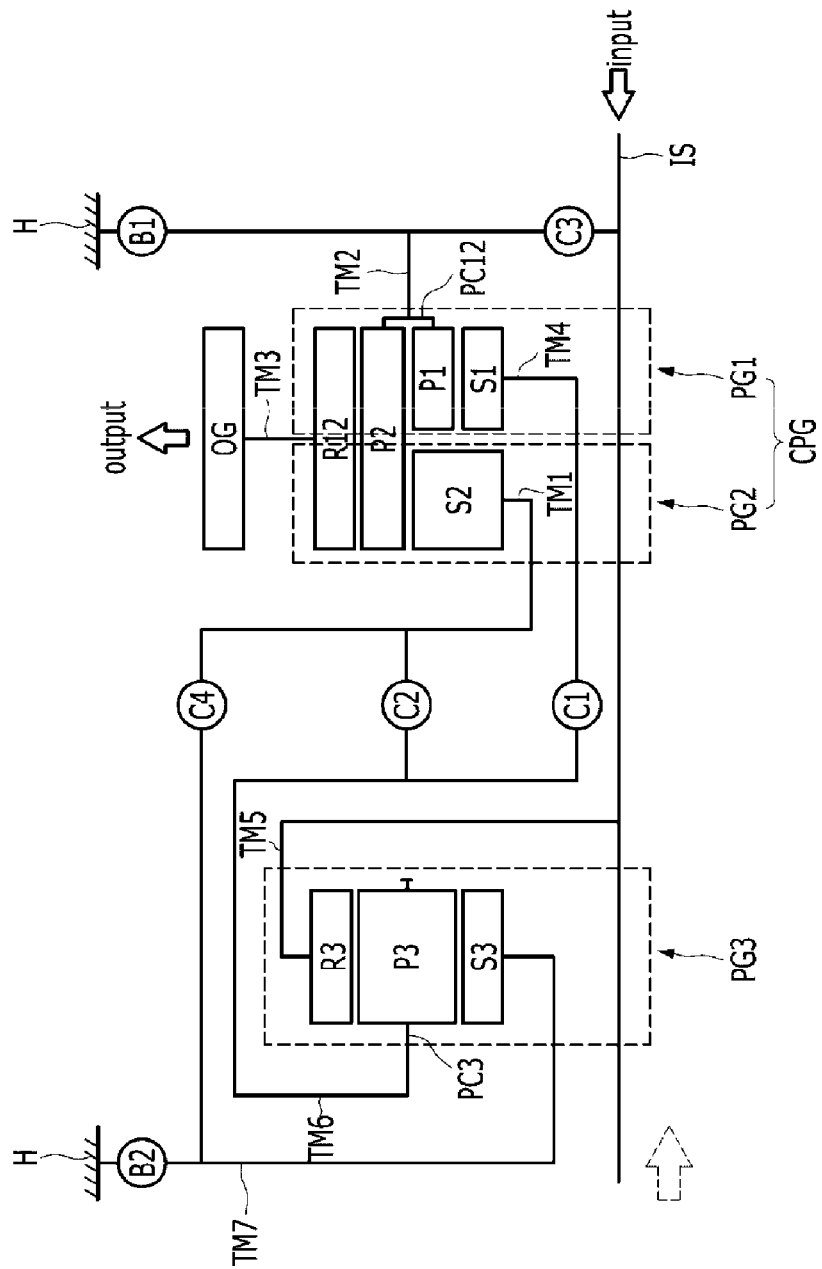
FIG. 1 is a schematic diagram of an exemplary planetary gear train according to the present invention.

FIG. 1 is a schematic diagram of a planetary gear train according to various embodiments of the present invention.

Referring to FIG. 1, a planetary gear train according to various embodiments of the present invention includes first, second, and third planetary gear sets PG1, PG2, and PG3 disposed on the same axis, an input shaft IS, an output gear OG, seven rotational members TM1, TM2, TM3, TM4, TM5, TM6, and TM7 directly or selectively connecting rotational elements of the first, second, and third planetary gear sets PG1, PG2, and PG3, six friction members C1, C2, C3, C4, B1, and B2, and a transmission housing H.

In addition, a compound planetary gear set CPG of Ravingneaux type is formed by combining the first and second planetary gear sets PG1 and PG2, and the third planetary gear set PG3 is operated as an independent planetary gear set.

A torque input from the input shaft IS is changed by the compound planetary gear set CPG and the third planetary gear set PG3 and is output through the output gear OG.

In addition, the planetary gear sets are disposed in a sequence of the compound planetary gear set CPG and the third planetary gear set PG3 from an engine to the rear.

On the contrary, the planetary gear sets are disposed in a sequence of the third planetary gear set PG3 and the compound planetary gear set CPG from an engine to the rear.

The input shaft IS is an input member, and torque from a crankshaft of the engine is changed through a torque converter and is input to the input shaft IS.

The output gear OG is an output member and delivers driving torque so as to run driving wheels through a differential apparatus.

The compound planetary gear set CPG is formed by combining the first planetary gear set PG1 being a double pinion planetary gear set and the second planetary gear set PG2 being a single pinion planetary gear set so as to be the compound planetary gear set of Ravingneaux type having a ring gear and a planet carrier in common.

Therefore, the compound planetary gear set CPG is operated by four rotational elements consisting of the ring gear, the planet carrier, and two sun gears. For convenience of explanation, the ring gear is called a common ring gear R12, the planet carrier is called a common planet carrier PC12, the sun gear engaged with a short pinion P1 is called a first sun gear S1, and the sun gear engaged with a long pinion P2 is called a second sun gear S2.

The third planetary gear set PG3 is a single pinion planetary gear set, and has a third sun gear S3, a third ring gear R3, and a third planet carrier PC3 supporting a third pinion P3 engaged to the third sun gear S3 and the third ring gear R3.

The compound planetary gear set CPG and the third planetary gear set PG3 are operated by seven rotational members TM1-TM7.

The first rotational member TM1 consists of the second sun gear S2.

The second rotational member TM2 consists of the common planet carrier PC12, and is selectively connected to the input shaft IS so as to be operated as a selective input element or is selectively connected to the transmission housing H so as to be operated as a selective fixed element.

The third rotational member TM3 consists of the common ring gear R12 and is connected to the output gear OG so as to be operated as a final output member.

The fourth rotational member TM4 consists of the first sun gear S1.

The fifth rotational member TM5 consists of the third ring gear R3 and is directly connected to the input shaft IS so as to be always operated as an input element.

The sixth rotational member TM6 consists of the third planet carrier PC3 and is operated as an output element.

The seventh rotational member TM7 consists of the third sun gear S3 and is operated as an output element or is selectively connected to the transmission housing H so as to be operated as a selective fixed element.

In addition, clutches among friction members are operated so as to selectively connect the rotational member operated as the selective input element among the rotational members TM1-TM7 to the input shaft IS or to selectively connect the rotational members TM1-TM7 to each other.

In addition, brakes among the friction members are operated so as to selectively connect the rotational member operated as the selective fixed element among the rotational members TM1-TM7 to the transmission housing H.

A first clutch C1 is interposed between the fourth rotational member TM4 and the sixth rotational member TM6 so as to selectively connect the fourth rotational member TM4 with the sixth rotational member TM6.

A second clutch C2 is interposed between the first rotational member TM1 and the sixth rotational member TM6 so as to selectively connect the first rotational member TM1 with the sixth rotational member TM6.

A third clutch C3 is interposed between the input shaft IS and the second rotational member TM2 so as to selectively connect the input shaft IS with the second rotational member TM2.

A fourth clutch C4 is interposed between the first rotational member TM1 and the seventh rotational member TM7 so as to selectively connect the first rotational member TM1 with the seventh rotational member TM7.

A first brake B1 is interposed between the second rotational member TM2 and the transmission housing H so as to operate the second rotational member TM2 as the selective fixed element.

A second brake B2 is interposed between the seventh rotational member TM7 and the transmission housing H so as to operate the seventh rotational member TM7 as the selective fixed element.

In addition, the friction members consisting of the first, second, third, and fourth clutches C1, C2, C3, and C4 and the first and second brakes B1 and B2 are conventional multi-plate friction elements of wet type that are operated by hydraulic pressure.

FIG. 2 is an operational chart of friction members at each shift-speed applied to a planetary gear train according to various embodiments of the present invention.

As shown in FIG. 2, three friction members are operated at each shift-speed in the planetary gear train according to various embodiments of the present invention.

A first forward speed D1 is achieved by operating the first and fourth clutches C1 and C4 and the first brake B1.

A second forward speed D2 is achieved by operating the first clutch C1 and the first and second brakes B1 and B2.

A third forward speed D3 is achieved by operating the first and fourth clutches C1 and C4 and the second brake B2.

A fourth forward speed D4 is achieved by operating the first and second clutches C1 and C2 and the second brake B2.

A fifth forward speed D5 is achieved by operating the first and third clutches C1 and C3 and the second brake B2.

A sixth forward speed D6 is achieved by operating the first, second, and third clutches C1, C2, and C3.

A seventh forward speed D7 is achieved by operating the second and third clutches C2 and C3 and the second brake B2.

An eighth forward speed D8 is achieved by operating the third and fourth clutches C3 and C4 and the second brake B2.

A first reverse speed REV1 is achieved by operating the second clutch C2 and the first and second brakes B1 and B2.

A second reverse speed REV2 is achieved by operating the second and fourth clutches C2 and C4 and the first brake B1.

Figure 3:
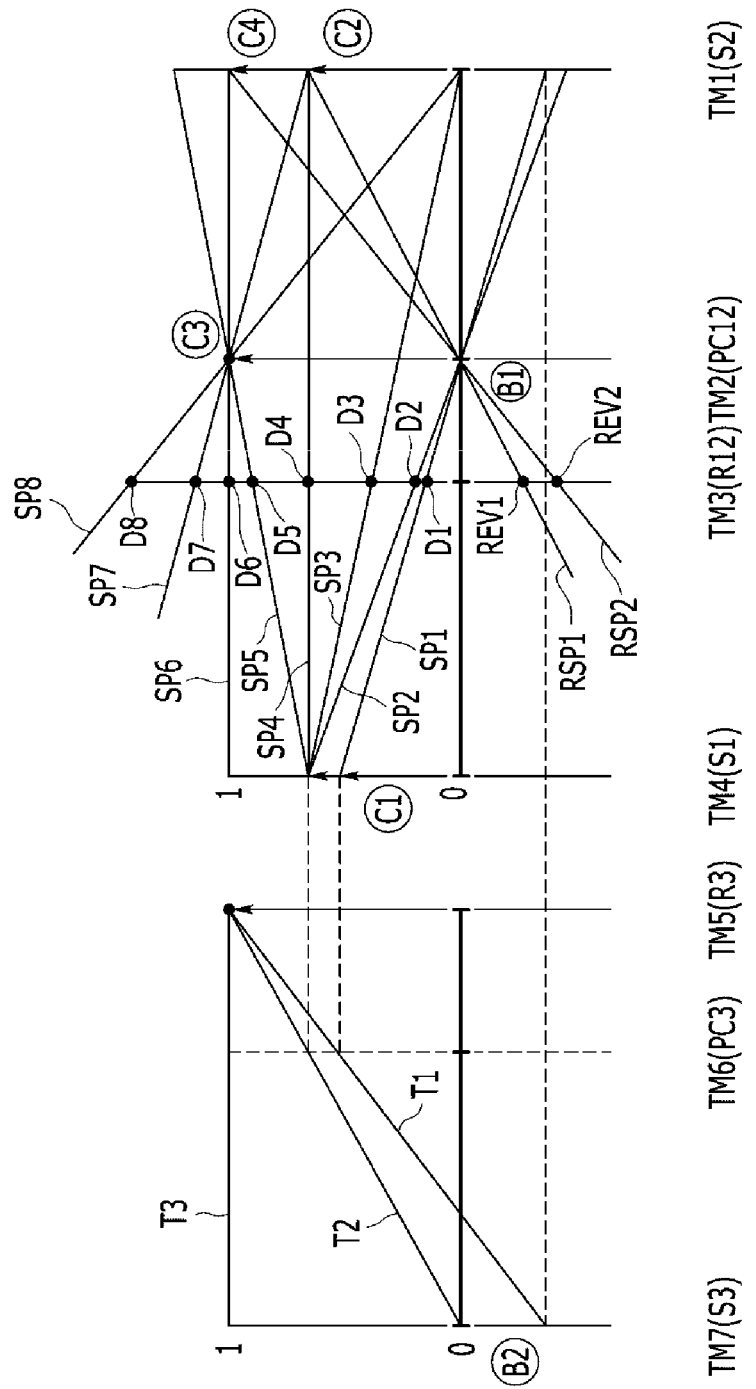
FIG. 3 is a lever diagram for an exemplary planetary gear train according to the present invention.

FIG. 3 is a lever diagram for a planetary gear train according to various embodiments of the present invention.

Referring to FIG. 3, shifting processes for each shift-speed will be described in detail.

First Forward Speed

The first and fourth clutches C1 and C4 and the first brake B1 are operated at the first forward speed D1.

That is, in a state that torque of the input shaft IS is input to the fifth rotational member TM5, the first and fourth clutches C1 and C4 and the first brake B1 are operated.

Therefore, the rotational elements of the third planetary gear set PG3 form a first speed line T1 and the rotational elements of the compound planetary gear set CPG form a first shift line SP1 by operation of the third planetary gear set PG3 and the compound planetary gear set CPG. Therefore, the first forward speed D1 is output through the third rotational member TM3.

Second Forward Speed

The first clutch C1 and the first and second brakes B1 and B2 are operated at the second forward speed D2.

That is, in a state that torque of the input shaft IS is input to the fifth rotational member TM5, the first clutch C1 and the first and second brakes B1 and B2 are operated.

Therefore, the rotational elements of the third planetary gear set PG3 form a second speed line T2 and the rotational elements of the compound planetary gear set CPG form a second shift line SP2 by operation of the third planetary gear set PG3 and the compound planetary gear set CPG. Therefore, the second forward speed D2 is output through the third rotational member TM3.

Third Forward Speed

The first and fourth clutches C1 and C4 and the second brake B2 are operated at the third forward speed D3.

That is, in a state that torque of the input shaft IS is input to the fifth rotational member TM5, the first and fourth clutches C1 and C4 and the second brake B2 are operated.

Therefore, the rotational elements of the third planetary gear set PG3 form the second speed line T2 and the rotational elements of the compound planetary gear set CPG form a third shift line SP3 by operation of the third planetary gear set PG3 and the compound planetary gear set CPG. Therefore, the third forward speed D3 is output through the third rotational member TM3.

Fourth Forward Speed

The first and second clutches C1 and C2 and the second brake B2 are operated at the fourth forward speed D4.

That is, in a state that torque of the input shaft IS is input to the fifth rotational member TM5, the first and second clutches C1 and C2 and the second brake B2 are operated.

Therefore, the rotational elements of the third planetary gear set PG3 form the second speed line T2 and the rotational elements of the compound planetary gear set CPG form a fourth shift line SP4 by operation of the third planetary gear set PG3 and the compound planetary gear set CPG. Therefore, the fourth forward speed D4 is output through the third rotational member TM3.

Fifth Forward Speed

The first and third clutches C1 and C3 and the second brake B2 are operated at the fifth forward speed D5.

That is, in a state that torque of the input shaft IS is input to the fifth rotational member TM5, the first and third clutches C1 and C3 and the second brake B2 are operated.

Therefore, the rotational elements of the third planetary gear set PG3 form the second speed line T2 and the rotational elements of the compound planetary gear set CPG form a fifth shift line SP5 by operation of the third planetary gear set PG3 and the compound planetary gear set CPG. Therefore, the fifth forward speed D5 is output through the third rotational member TM3.

Sixth Forward Speed

The first, second, and third clutches C1, C2, and C3 are operated at the sixth forward speed D6.

In a state that torque of the input shaft IS is input to the fifth rotational member TM5, torque of the input shaft IS is also input to the second rotational member TM2 by operation of the third clutch C3. In addition, the fourth rotational member TM4 is connected to the sixth rotational member TM6 by operation of the first clutch C1, and the first rotational member TM1 is connected to the sixth rotational member TM6 by operation of the second clutch C2.

Therefore, the third planetary gear set PG3 and the compound planetary gear set CPG become direct-coupling states such that the rotational elements of the third planetary gear set PG3 form a third speed line T3 and the rotational elements of the compound planetary gear set CPG form a sixth shift line SP6. Therefore, the sixth forward speed D6 is output through the third rotational member TM3. That is, speed output through the output gear OG is the same as that of the input shaft IS.

Seventh Forward Speed

The second and third clutches C2 and C3 and the second brake B2 are operated at the seventh forward speed D7.

That is, in a state that torque of the input shaft IS is input to the fifth rotational member TM5, the second and third clutches C2 and C3 and the second brake B2 are operated.

Therefore, the rotational elements of the third planetary gear set PG3 form the second speed line T2 and the rotational elements of the compound planetary gear set CPG form a seventh shift line SP7 by operation of the third planetary gear set PG3 and the compound planetary gear set CPG. Therefore, the seventh forward speed D7 is output through the third rotational member TM3.

Eighth Forward Speed

The third and fourth clutches C3 and C4 and the second brake B2 are operated at the eighth forward speed D8.

That is, in a state that torque of the input shaft IS is input to the fifth rotational member TM5, the third and fourth clutches C3 and C4 and the second brake B2 are operated.

Therefore, the rotational elements of the third planetary gear set PG3 form the second speed line T2 and the rotational elements of the compound planetary gear set CPG form an eighth shift line SP8 by operation of the third planetary gear set PG3 and the compound planetary gear set CPG. Therefore, the eighth forward speed D8 is output through the third rotational member TM3.

First Reverse Speed

The second clutch C2 and the first and second brakes B1 and B2 are operated at the first reverse speed REV1.

That is, in a state that torque of the input shaft IS is input to the fifth rotational member TM5, the second clutch C2 and the first and second brakes B1 and B2 are operated.

Therefore, the rotational elements of the third planetary gear set PG3 form the second speed line T2 and the rotational elements of the compound planetary gear set CPG form a first reverse shift line RSP 1 by operation of the third planetary gear set PG3 and the compound planetary gear set CPG. Therefore, the first reverse speed REV1 is output through the third rotational member TM3.

Second Reverse Speed

The second and fourth clutches C2 and C4 and the first brake B1 are operated at the second reverse speed REV2.

That is, in a state that torque of the input shaft IS is input to the fifth rotational member TM5, the second and fourth clutches C2 and C4 and the first brake B1 are operated.

Therefore, the rotational elements of the third planetary gear set PG3 form the second speed line T2 and the rotational elements of the compound planetary gear set CPG form a second reverse shift line RSP2 by operation of the third planetary gear set PG3 and the compound planetary gear set CPG. Therefore, the second reverse speed REV2 is output through the third rotational member TM3.

As described above, eighth forward speeds and two reverse speeds are achieved by combining three planetary gear sets with six friction members and by operating three friction members at each shift-speed according to various embodiments of the present invention.

Since six friction members are used, a hydraulic control system controlling the friction members can be simplified, and cost and weight may be reduced. In addition, it is easy for the planetary gear train to be mounted.

A sequential shifting is performed by releasing one friction member and operating another friction member. Therefore, shift control may be facilitated.

Since at least three friction members are operated at each shift-speed, the number of the friction members that are not operated can be reduced. Therefore, drag loss may be reduced and power delivery efficiency and fuel economy may be further improved.

Since two reverse speeds are achieved, performance in reverse speeds may be improve.

For convenience in explanation and accurate definition in the appended claims, the terms rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the aims appended hereto and their equivalents.

What is claimed is:

1. A planetary gear train of an automatic transmission for vehicles, comprising:
    an input shaft adapted to receive engine torque;
    an output gear adapted to output changed torque;
    a compound planetary gear set formed by combining first and second planetary gear sets and including a first sun gear, a second sun gear, a common planet carrier, and a common ring gear as rotational elements thereof;
    a third planetary gear set including a third sun gear, a third planet carrier, and a third ring gear as rotational elements thereof;
    a first rotational member consisting of the second sun gear;
    a second rotational member consisting of the common planet carrier, and selectively connected to the input shaft so as to be operated as a selective input element or selectively connected to a transmission housing so as to be operated as a first selective fixed element;
    a third rotational member consisting of the common ring gear and connected to the output gear so as to be operated as a final output member;
    a fourth rotational member consisting of the first sun gear;
    a fifth rotational member consisting of the third ring gear and directly connected to the input shaft so as to be always operated as an input element;
    a sixth rotational member consisting of the third planet carrier;
    a seventh rotational member consisting of the third sun gear and operated as an output element or selectively connected to the transmission housing so as to be operated as a second selective fixed element; and
    six friction members including:
        clutches selectively connecting the second rotational member operated as the selective input element to the input shaft or selectively connecting at least two rotational members together, wherein the clutches comprise:
            a first clutch disposed between the fourth rotational member and the sixth rotational member;
            a second clutch disposed between the first rotational member and the sixth rotational member;
            a third clutch disposed between the input shaft and the second rotational member;

a fourth clutch disposed between the first rotational member and the seventh rotational member; and a first brake disposed between the second rotational member and the transmission housing, wherein the first brake selectively connects the second rotational member operated as the first selective fixed element to the transmission housing; and a second brake disposed between the seventh rotational member and the transmission housing, wherein the second brake selectively connects the seventh rotational member operated as the second selective fixed element to the transmission housing;

wherein forward speeds achieved by operating three friction members among the six friction members comprise:

a first forward speed achieved by operating the first and fourth clutches and the first brake;

a second forward speed achieved by operating the first clutch and the first and second brakes;

a third forward speed achieved by operating the first and fourth clutches and the second brake;

a fourth forward speed achieved by operating the first and second clutches and the second brake;

a fifth forward speed achieved by operating the first and third clutches and the second brake;

a sixth forward speed achieved by operating the first, second, and third clutches;

a seventh forward speed achieved by operating the second and third clutches and the second brake; and an eighth forward speed achieved by operating the third and fourth clutches and the second brake.

2. The planetary gear train of claim 1, wherein the first planetary gear set is a double pinion planetary gear set, the second planetary gear set is a single pinion planetary gear set, and the third planetary gear set is a single pinion planetary gear set.

3. The planetary gear train of claim 1, wherein the compound planetary gear set and the third planetary gear set are disposed in a sequence of the compound planetary gear set and the third planetary gear set from an engine to a rear of the engine.

4. The planetary gear train of claim 1, wherein reverse speeds achieved by operating three friction members among the six friction members comprise:

a first reverse speed achieved by operating the second clutch and the first and second brakes; and a second reverse speed achieved by operating the second and fourth clutches and the first brake.

* * * * *